Aug. 11, 1942.   R. H. JORDAN   2,292,567
ELECTRIC MOTOR
Original Filed March 19, 1941   5 Sheets-Sheet 1

Inventor
Richard H. Jordan
By Rockwell & Bartholow
Attorneys

Aug. 11, 1942.   R. H. JORDAN   2,292,567
ELECTRIC MOTOR
Original Filed March 19, 1941   5 Sheets-Sheet 3

Inventor
Richard H. Jordan
By Rockwell Bartholow
Attorneys

Aug. 11, 1942.   R. H. JORDAN   2,292,567
ELECTRIC MOTOR
Original Filed March 19, 1941   5 Sheets—Sheet 5

Inventor
Richard H. Jordan
By Rockwell H. Bartholow
Attorneys

Patented Aug. 11, 1942

2,292,567

UNITED STATES PATENT OFFICE 2,292,567

ELECTRIC MOTOR

Richard H. Jordan, Mansfield, Ohio, assignor to The A. C. Gilbert Company, New Haven, Conn., a corporation of Maryland Original application March 19, 1941, Serial No. 384,148. Divided and this application September 13, 1941, Serial No. 410,659

21 Claims. (Cl. 171—229)

This invention relates to electric motors of the general type described in my application Serial No. 384,148, filed March 19, 1941, of which the present application is a division, and it has special reference to the provisions for controlling the speed of electric motors, particularly those used for driving kitchen mixers, and similar work.

One of the objects of the invention is to provide an improved speed-controlling device.

Another object is to improve the provisions for controlling the speed of the motor so that the speed can be nicely adapted to the particular operation which is being undertaken. In the case of a kitchen mixer motor the speed can be nicely adjusted for such operations as mashing potatoes, extracting orange juice, whipping cream, or chopping meat, for example, the speed variation being through quite a wide range.

Another object is to provide for an electric motor a speed-governing mechanism which is to a large degree of unitary character, occupying a separate casing part and adapted for very convenient assemblage with the other parts of the device, doing away with tedious operations of wiring which have heretofore made the assemblage of such devices a difficult and time-consuming operation.

To these and other ends the invention consists in the novel features and combinations of parts to be hereinafter described and claimed.

In its general features the improved electric motor is similar to that described in my Patent No. 2,247,708 of July 1, 1941, involving a combined motor and gear casing having an electric motor in the rear and gearing in the front, the electric motor having a horizontal forwardly extending shaft, and the gearing comprising horizontal gears located laterally of and driven from the motor shaft, there being an assembly mounted within the front portion of the casing comprising a vertical shaft connected to and driven by and from one of said gears, and having a depending portion adapted to drive a tool such as an agitator or beater below the casing, and an upwardly extending portion adapted to drive a tool such as a juice reamer above the casing, and a horizontal shaft termed a power shaft geared to and driven from that portion of the vertical shaft located above the motor shaft, the casing having a socket in its front portion into which a tool or accessory can be introduced for coupling to the power shaft. However, in this new construction the speed-controlling mechanism, instead of being disposed for the most part in the front portion of the casing, is contained in a separate casing portion at the rear of the motor, and forms with said casing portion a self-contained unit, as hereinafter more particularly pointed out. As in the previous application, the motor is adapted to be removably supported on the upper end of a suitable pedestal, and for lifting purposes is provided with a handle, but in the present instance the handle has a somewhat different form and arrangement, and there is a different arrangement of the power shaft.

In the drawings the casing of the motor member in its entirety is indicated at A, and comprises a front portion A' containing the gearing, a main portion A² containing the motor proper, and a relatively small rear portion A³ containing the speed-controlling mechanism. These portions of the casing are all separately constructed and are adapted to be inter-connected in the manner hereinafter described. The electric motor is indicated generally at B, the front gearing at C, the speed-controlling mechanism at D. The motor shaft is shown at E, the vertical shaft in the front portion of the casing at F, the power shaft at G, and the so-called power socket in the front portion of the casing at H. The handle for the motor member is shown at I, and it will be noted that this handle is connected at one end to the casing portion A' and at the other end to the casing portion A³. A portion of the supporting pedestal of the motor member is shown at J, and at K is indicated a part of the electric cable structure leading into the motor through the lower rear part of the casing.

Referring now to the details, I will take up first the main portion or section A² of the casing and the parts therein contained. The casing portion is preferably a die casting having a spider 25 at the rear in which the motor shaft E has a bearing 26. On the motor shaft is an armature 27 rotating within the field core 28 having the usual field winding 29, these latter parts being held in the casing in the usual or any preferred manner. In front of the armature the motor shaft has a bearing 30 in a removable partition 31 secured in a seat 32 adjacent the front end of the casing section. The partition 31 may be held in place by means such as screws 33. Between the partition 31 and the armature, the motor shaft carries a ventilating fan or impeller 34. This fan is adapted to suck air from suitable air openings such as the slot-like openings 35 at the lower rear portion of the casing section, and the air passed on by the fan is thrown radially outwardly so as to leave the casing section by way of air exit openings 36. These air exit openings 36 may be conveniently formed as notches in the forward edge of the casing section at the lower part of the section, the forward ends of the notches being closed by the partition 31.

At its lower rear portion the casing section A² has an integral projection 37 by means of which the motor member may be conveniently mounted in a removable manner upon the upper end portion of the pedestal J, but this mounting means forms no part of the present invention.

At its rear end the motor shaft E is extended past the spider 25, and at its extremity carries a fan or impeller 38 which is preferably mounted within the casing section A³ when the device is assembled, and serves as a part of the speed-controlling means in the manner hereinafter described. Between the fan or impeller 38 and the spider structure 25 a suitable thrust bearing 39 is interposed. Preferably the fan is held on the shaft by means such as a set screw 40. The motor shaft E is provided at its forward end with a worm 41 cooperating with the gearing, hereinafter described, and as in operation the motor shaft tends to be drawn in a forward direction, the thrust bearing 39 is provided so as to transfer the forward thrust on the shaft to the rear bearing support.

The cable K enters the casing through a groove or recess 42 formed partly in the lug 37.

Figure 6:
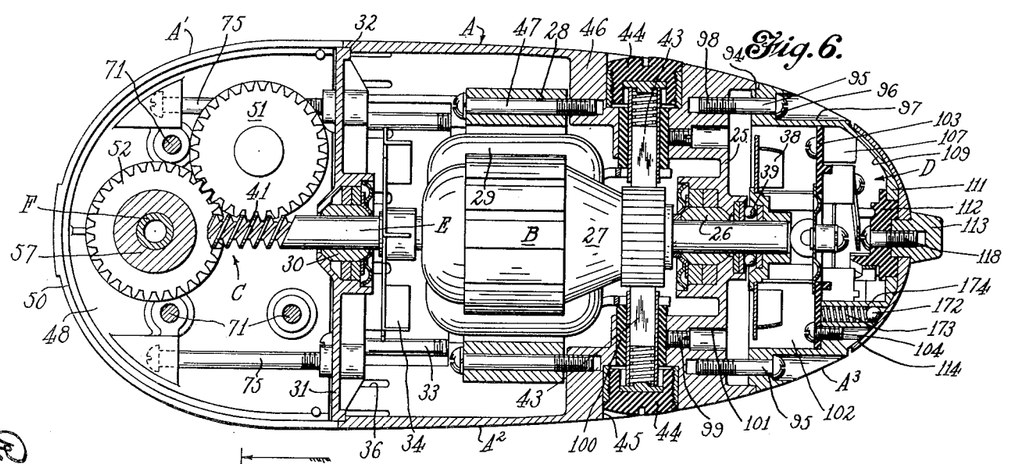
Fig. 6 is a section on line 6—6 of Fig. 5.

The motor has the usual or any preferred brushes 43, the action of which is controlled by adjustable screw caps 44 of insulating material occupying sockets 45 formed in the sides of casing section A². Fig. 6 shows the field core 28 as held in place against an abutment 46 in the rear part of section A² by means of screws 47.

The worm 41 on the forward end of the motor shaft extends forwardly into section A', and there cooperates with the gearing in that section. The casing portion containing the gearing is divided in a horizontal plane so as to provide upper and lower parts, the lower part being indicated at 48 and the upper part at 49. The joint between these parts is shown at 50 in Fig. 5, and is preferably in the same horizontal plane as the motor axis.

The worm 41 at the end of the motor shaft engages and drives a relatively deep worm gear 51 positioned to one side of the motor shaft in the manner shown in Fig. 6, and this deep gear 51 engages and drives a shallow worm gear 52 whose axis in this particular case is in line with the motor shaft, as shown in Fig. 6. The shallow gear 52 drives the vertical shaft F previously referred to, and the latter shaft drives the power shaft G. The vertical shaft F is preferably formed as a tube, the lower end of which is accessible in a socket 53 at the lower part of casing member 48 to receive and drive the shank 54 of a suitable tool such as a beater. The upper end of the vertical shaft extends upwardly out of casing part 49, and is adapted to receive and drive the shank 55 of a suitable tool such as an orange reamer. The lower part of the tubular vertical shaft is adapted to rotate in a sleeve portion 56 projecting upwardly in part 48, and preferably formed integrally therewith. Above this sleeve and supported for rotation thereon is a member 57 to which the shallow pinion 52 is suitably secured, and member 57 is connected to the hollow shaft F by suitable means, for example, a pin 58, the arrangement being such that rotation imparted to gear 52 is transmitted in an effective manner to member 57 and to shaft F. Member 57 at its upper portion is cut or otherwise provided with a worm 59 meshing with a gear 60 on shaft G in order to drive said shaft.

The gear 51, as well as gear 52, is adapted to drive a tool shaft depending from the casing, and for this purpose gear 51 is secured at the upper end of a hollow shaft 61 mounted in a sleeve 62 similar to sleeve 56, this sleeve being open at the bottom in order that the shank 63ª of a beater or like tool may be introduced and locked to hollow shaft 61 so as to be driven directly by gear 51 as the latter rotates.

In the preferred arrangement the worm on the motor shaft engages the upper part of the deep gear 51 in such a manner that this gear is driven, while the lower part of the gear directly meshes with the narrow gear 52 in order that the vertical shaft may be driven in a very direct and effective manner.

Figure 5:
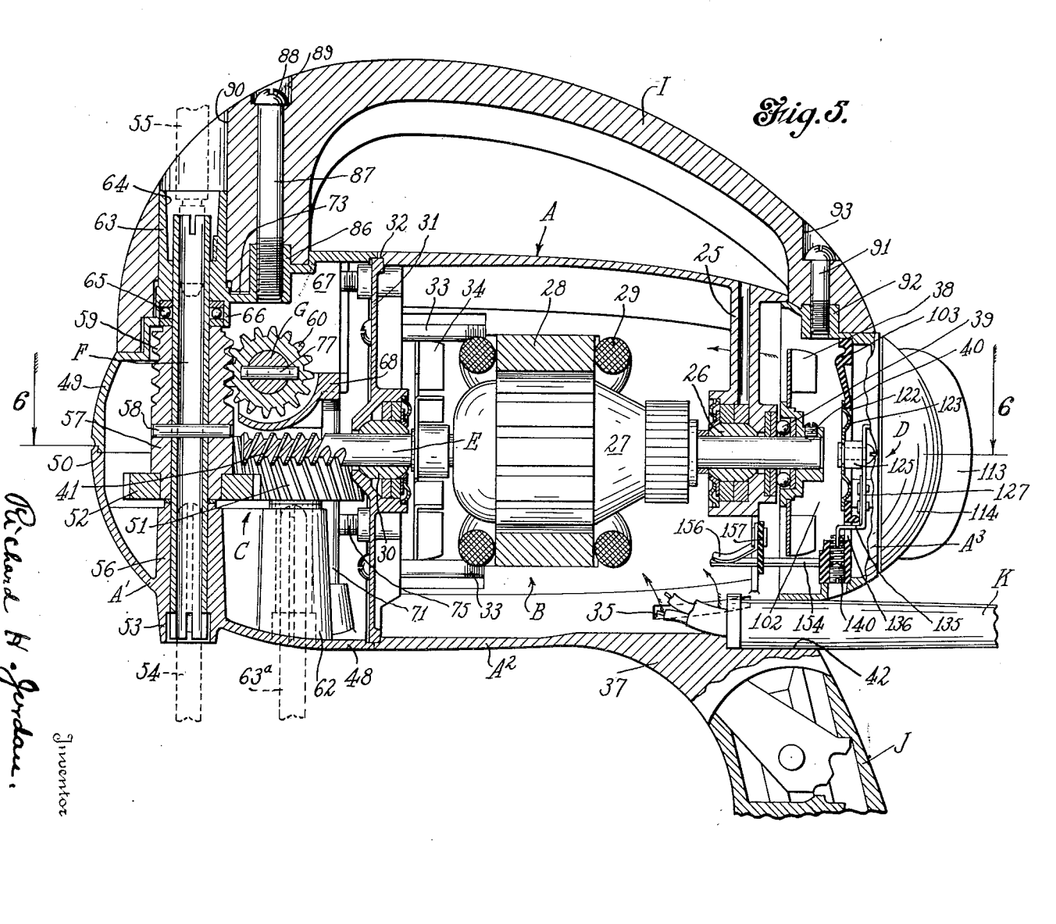
Fig. 5 is an enlarged section on line 5—5 of Fig. 2.

The form of the upper part 49 is shown in Fig. 5. At its upper part it is provided with an integral upwardly extending sleeve or bearing portion 63 adapted to act as a bearing portion for the upper end portion of the tubular shaft F, and this sleeve presents a socket 64 extending around and somewhat above the upper end of shaft F. Within the casing part 49 between the base of the sleeve-like portion 63 and the upper end of the worm 57 is interposed an anti-friction thrust bearing 65 which takes the upward thrust on the vertical shaft F when the power shaft G is being operated. A socket 66 in which the same is adapted to be retained is shown. Fig. 5 shows an integral cast bearing-supporting structure 67 at the upper part of the casing against which the power shaft G is mounted, the bearing of said shaft being retained from beneath by a cap member 68 fastened to the other bearing-supporting member by screws adjacent each end of the shaft. The parts 48 and 49 of the front section of the casing are secured to each other by three screws 71, which are screwed through part 48 from beneath and engage threaded sockets in the structure of the transverse bearing provided for the power shaft G.

Figure 4:
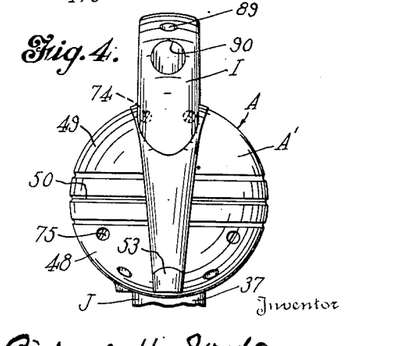

Around the upwardly extending sleeve 63 the upper part of the casing is cut away to provide a recess 73 receiving the front end of the handle I, and the front section A' of the casing is fastened to the main section A² by suitable means such as screws 74 disposed with their heads in the rear portion of recess 73, as shown in Fig. 4. At the lower part of casing section A' the same is fastened to section A² by screws 75 having their forward headed ends disposed and concealed in recesses 76 in the forward curved surface of the casing.

The worm gear 60, previously mentioned, by which the power shaft is driven, is attached to the intermediate portion of said shaft by means such as a pin 77. At the right-hand end of the power shaft the same has an enlarged portion 81 rotating in an opening formed between parts 67 and 68. The extremity of this enlarged part of the power shaft is provided with a notch 82 so that it may be drivingly engaged with the tenoned shaft of an accessory appliance introduced partially into the power socket H.

Rising from the upper casing portion 49 behind the sleeve 63 within the handle-receiving recess 73 is a small interiorly threaded screw socket 86, shown in Fig. 5, and this socket is adapted to receive the lower threaded end of a screw 87 by means of which the handle I is attached to the casing. This screw passes through a hole in the downwardly curved front end portion of the handle, and the upper end 88 of the screw is received and partially concealed in recess 89 in the handle. This recess 89 is located behind a larger hole 90 through the handle, providing clearance for the tool shaft 55 previously mentioned, which may be the shaft of an orange juicer. The hole 90 enables the front end portion of the handle to be inserted downwardly into the handle-receiving and positioning recess 73, with the handle surrounding the sleeve 63, previously mentioned. The upper end of the sleeve 63 preferably terminates, as shown, short of the upper end of hole 90, so that the upper end of shaft F and its associated bearing are for the most part concealed from view.

The handle I is preferably made of suitable plastic composition molded to the required shape. Its rear end is attached to the casing section A³ by means such as a screw 91 engaging an interiorly threaded sleeve 92 formed on casing section A³ at its upper part. The upper end of screw 91 is received and concealed in a recess 93 in the handle.

The casing section A³, which I refer to as the governor casing, is of somewhat reduced diameter as compared to the main casing section A², and is applied to the rear of the latter, and has its external wall curved or rounded so that, with the other two sections, a casing of ovoid shape is created somewhat narrower at the rear than at the front. The section A² is generally of cup shape, and it may be advantageously formed as a die casting having socket portions 94 at the sides receiving screws 95 used for attaching this section removably to section A², the heads 96 of screws 95 being partially concealed in recesses 97 in the wall of section A³. These screws 95 engage threaded sockets 98 in certain arms of the spider 25 which is at the rear end of section A², and, as will be seen from Fig. 6, these arms of the spider form rear abutments or supports for the brushes of the motor. Set screws 99 for holding in place insulating sleeves 100 disposed about the brushes are accessible from the rear face of the spider by way of sockets 101 when the governor casing is removed. This structure is best seen in Fig. 6.

Figure 14:
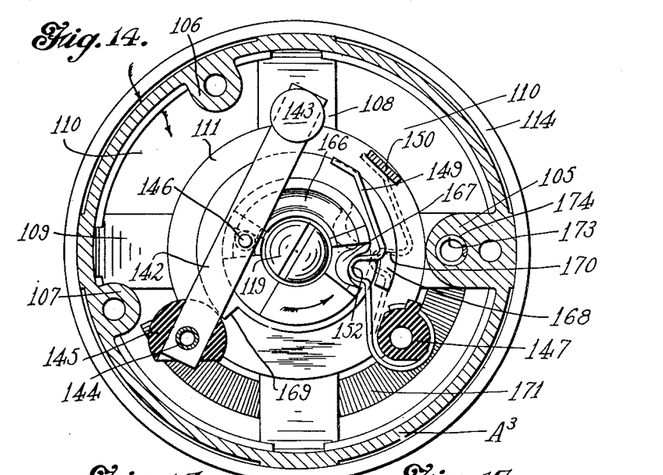
Fig. 14 is a section on line 14—14 of Fig. 12.
Figure 15:
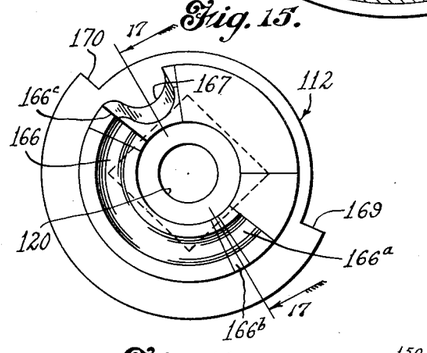
Figs. 15, 16 and 17 are details of the speed-controlling cam, Fig. 15 being a view looking from the front, Fig. 16 being an edge view, and Fig. 17 being a section on line 17—17 of Fig. 15.
Figure 16:
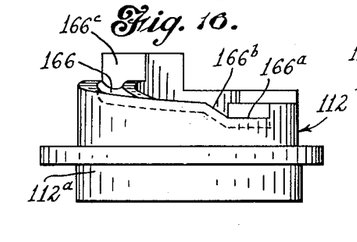
Figure 17:
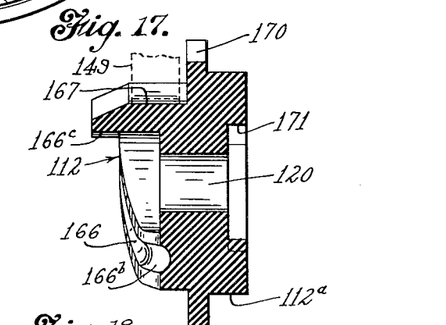

The fan or impeller 38 previously referred to is so arranged as to be within the front portion of section A³ within a chamber 102 in said section, this chamber being at the front of a partition 103 which extends transversely across the space within section A³. This partition in the preferred form shown is of insulating material and is removably held in place by screws 104 against lugs 105, 106 and 107 formed on the wall of the governor casing. These lugs are shown in Fig. 14, and from this view it will be seen that behind these lugs the governor casing is of spider-like formation having, in this particular case, upright arms 108 and lateral arms 109, creating between them open ventilating spaces 110 having the function hereinafter pointed out. At their inner parts the arms 108, 109 are joined to a central disk-like support 111 in which is mounted a cam 112 disposed interiorly of the casing and provided at the rear of the casing with an operating thumb-piece or head 113. Moving with the thumb-piece or head is a thin dished cover member 114 extending over and for the most part covering the spider portion of the casing, although permitting air to enter into the casing through the spider in the manner hereinafter pointed out.

Figures 7, 8, 12:
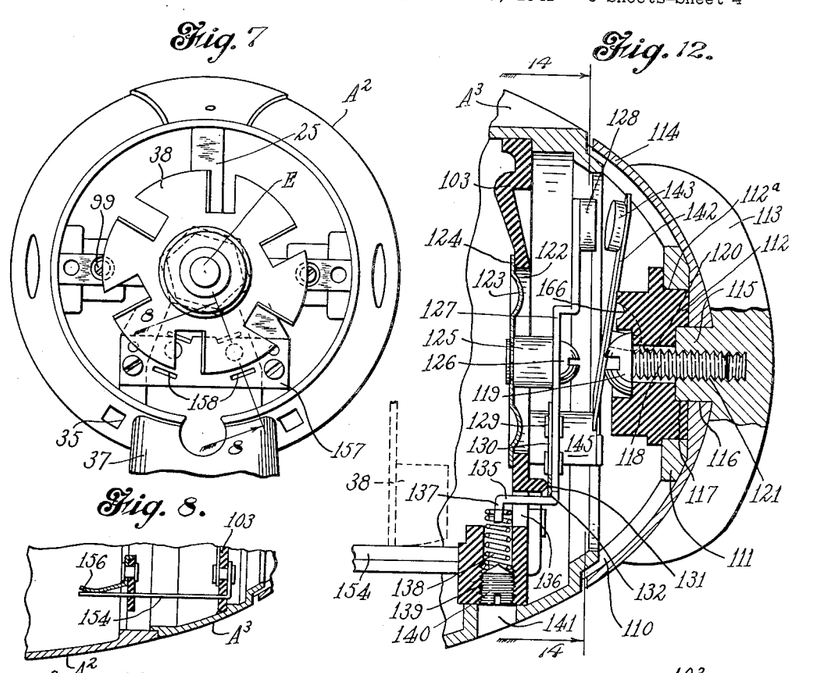
Fig. 7 is a view of the intermediate or main portion of the casing showing the governor case removed, and looking from the rear.
Fig. 8 is a detail section on line 8—8 of Fig. 7.
Fig. 12 is an enlarged section on line 12—12 of Fig. 9, showing the speed-controlling device in the "off" position.

The cam 112 is made of insulating material, and the thumb-piece 113 is also preferably made of insulating material. It will be seen from Fig. 12 that at its inner surface the thumb-piece is curved so as to conform to the surface of the cover piece 114. A squared portion 115 projects forwardly from the middle portion of the thumb-piece and is received in a correspondingly shaped hole 116 in the cover piece, and also in a correspondingly shaped shallow socket 117 in the cam. A screw 118 having a head 119 at the forward face of the cam passes through a hole 120 in the cam and into a threaded socket 121 in the thumb-piece, so that the thumb-piece, cover-piece and cam will be fastened together in the relation above described. Thus the thumb-piece when turned on its axis will turn the cover-piece and the cam. As shown in Fig. 12, the cam has a rear bearing portion 112ª engaging a bearing hole formed in the disk-like portion 111.

The partition 103, previously referred to, is provided at its central part with an air port or passage, and preferably this is constituted by a round aperture 122 in the partition. Cooperating with this aperture is an air valve or diaphragm 123 which may advantageously be formed as a thin sheet metal plate of ribbed construction. This plate is generally of disk shape and of somewhat greater diameter than aperture 122, and is disposed in front of the partition so that the peripheral portion 124 of the diaphragm may seat against the front face of the partition in the manner shown in Fig. 12, in order to prevent air from passing through aperture 122 in a forward direction from the open rear portion of the governor casing.

The diaphragm is movably mounted with respect to aperture 122, and preferably the mounting is as illustrated, the diaphragm being provided with a rearwardly projecting hub 125 to the rear end of which it attached, as by a screw 126, a swinging contact lever 127 having a pivoting lower portion and a freely swinging upper portion. The upper portion carries an electrical contact 128 operating in the manner hereinafter described. The manner of pivoting the lever 127 at its lower portion is preferably as illustrated in the drawings, a portion at the lower part of the lever being connected by small rivets 129 to a thin metal plate 130 disposed adjacent the front face of the lever portion. The lower part of plate 130 is disposed rearwardly of and against a pivoting or knife-edge portion 131 projecting rearwardly from the partition 103, the arrangement being such that lever 127 will pivot on the knife edge to swing the contact 128 in a forward and rearward direction. The plate 130 is of thin sheet metal, and is formed at the middle portion of a strip 132 integral therewith. The ends of the strip are fixed against bosses 133 on the partition by pins or rivets 134, but the middle portion of the strip is free to twist so that the lever can have the necessary pivoting movement against the knife edge 131.

The lower part of lever 127 immediately beneath the cross strip 132 is bent upwardly and forwardly to provide a portion 135 extending through an opening 136 in the partition, and the front end of this portion 135 is bent downward, as indicated at 137, to enter a small helical spring 138 mounted in a socket 139 adjacent the lower edge of the partition. A set screw 140, accessible in an opening 141 at the lower part of the governor case, regulates the action of the spring 138, which action is to force the extremity of the lever in an upward direction. By being forced in an upward direction at its lower part, the lever is caused to be urged in a rearward direction at that part which is connected to the diaphragm, and therefore the tendency of the spring is to hold the diaphragm in the closed position shown in Fig. 12.

Mounted behind the swinging contact lever 127 is a cooperating member 142 having a contact 143 adapted to be engaged by contact 128, as the latter is moved rearwardly. Preferably the member 142 is constituted by a resilient metal strip secured by a pin or rivet 144 (Fig. 11) against the rear face of a post 145 projecting rearwardly from the partition. The strip 142 has some resiliency, and intermediate of its ends it is provided with a rearwardly projecting pin 146 adapted to be engaged by the cam 112 in the manner hereinafter pointed out. As will be seen in Fig. 11, the post 145 is disposed somewhat to one side of lever 127, and at the opposite side of said lever is disposed a supporting post 147, to which is fastened by means such as screw 148 a swinging contact member 149. This contact member 149 is preferably formed as a sheet metal strip, the lower end portion of which is fixed in position against post 147, while the rear extremity is adapted to move toward and from a fixed contact member 150, preferably formed by an angular member secured by rivet 151 to the rear face of the partition. Intermediate of its ends strip or lever 149 is provided with a projecting portion or bend 152 adapted to be engaged by the cam 112 in the manner hereinafter described, and the arrangement is such that the motor will be in the running position only when the upper extremity of lever 149 is engaged with contact member 150.

In order to facilitate the making of the proper electrical connections between the motor circuit and the governor circuit, I have devised a construction in which the principal parts of the governor mechanism are mounted in a separate casing attachable to and detachable from the main portion of the casing, and I have provided an electrical connection of such nature that when the governor casing with its contained parts is placed against the main part of the device, for assemblage therewith, the two legs of an electrical circuit, including the motor and the governor (with or without other elements), will be automatically closed and established so that no further wiring will be required. Obviously this assists greatly in the assemblage and production of a motor structure of this kind, as it is merely necessary to plug together the main and supplemental casings in order to establish the electrical connections. In the preferred construction the governor mechanism to be applied to the main casing has forwardly projecting prongs, which, when the assemblage is made, are automatically moved into cooperative engagement with cooperative contact members carried by the main section of the device adjacent the rear end thereof. Preferably the prongs are carried by and project forwardly from the partition member 103, and preferably these prongs cooperate with contact members in the form of spring leaves carried in the rear end portion of casing section $A^2$, but while this construction is preferred, many variations will suggest themselves to those skilled in the art. In the present case I have illustrated prong members 153, 154 projecting forwardly from partition 103 in locations adjacent the lower edge of said partition. Prong 153 in the assembled position establishes contact with a fixed contact leaf 155, and prong 154 establishes contact with a fixed contact leaf 156. These leaves 155 and 156 are mounted on an insulating supporting plate 157 attached preferably to the spider 25 at the lower part thereof in the manner shown in Fig. 7. These contact leaves are disposed forwardly of the insulating plate, and are supported thereby in a suitable manner, as shown, for example, in Fig. 8, and it will be noted that the insulating plate has slots 158 to receive the prongs as the latter are thrust forward. As the prongs are thrust through the slots they come into contact with the resilient contact leaves, which latter are pressed laterally thereby so as to make and maintain good electrical contacts at these points.

Figure 9:
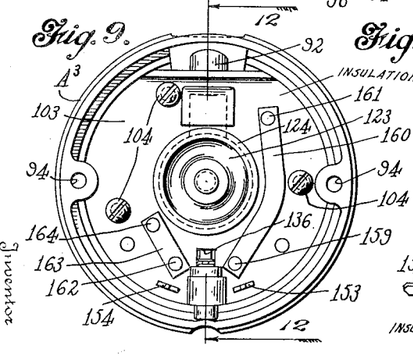
Fig. 9 is a detail view of the governor case and its contained parts, looking from the front.
Figure 10:
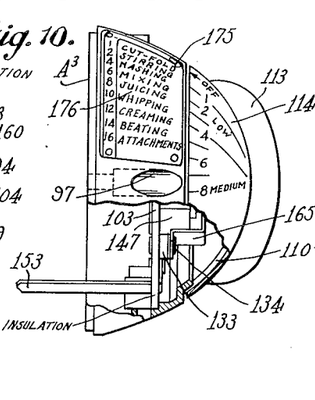
Fig. 10 is a side view of the governor case partly broken away.
Figure 11:
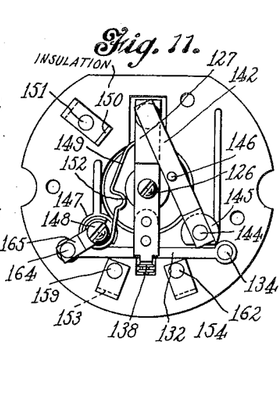
Fig. 11 is a rear view of the partition member of the governor case, detached.

Referring particularly to Figs. 9 to 11, inclusive, it will be seen that prong 153 has its rear portion connected by a pin 159 to a conductor strip 160 at the front face of the partition, which strip 160, by means of a pin 161, is connected to the contact member 150, previously referred to. The prong 154, on the other hand, has its rear portion connected by a pin 162 to a short conducting strip 163 at the front face of the partition, and this strip, by means of a pin 164, is connected to the pin 144, previously mentioned, which pin 144 is electrically connected with the spring arm 142. The cross strip 132, previously mentioned, which forms a part of the mounting means for lever 127, also constitutes a part of the electrical circuit because at its left-hand end (Fig. 11) this strip is connected by a small connecting strip 165 with the screw 148 and contact arm 149. In order to have the motor operate with the connections as shown, it is necessary to have contact established between contact member 150 and arm 149, and it is also necessary to have contact established between contact members 128 and 143. The making and breaking of the circuit at these two points is controlled by the cam member 112, the forward portion of which is formed to cooperate with and move the contact arm 142 and also the contact arm 149.

For the purpose of controlling the position of arm 142, which is provided with the rearwardly projecting pin 146, the forward face of cam 112 is provided with a groove 166 in which the pin 146 rides, and this groove 166 is so arranged that, as the thumb-piece 113 is rotated in one direction, contact 143 is swung forwardly, whereas when the thumb-piece is moved in the other direction, said contact will be permitted by its spring action to move rearwardly.

Contact arm 149 has generally speaking a radially inward and outward swinging movement with respect to the motor axis, and in order to control this movement the bent or projecting portion 152 of said arm is arranged to bear against the side of the cam 112, and to cooperate with a cut-away portion or notch 167 formed in the side of the cam. When the projection 152 lies in this notch, as shown in Fig. 14, arm 149 is out of contact with contact member 150, and the circuit is broken at this point. This is the "off" position of the speed-controlling device or switch, in which position contact members 143 and 128 are out of contact with each other, as shown in Fig. 12, and thus in this "off" position the circuit is broken in two places, which is a very desirable feature for safety purposes.

When the cam is in the "off" position shown in Figs. 12 and 14, the pin or projection 146 lies in a depressed portion 166ª of the cam, best shown in Fig. 14. Upon rotation of the cam in a counter-clockwise direction with respect to Fig. 14, projection 146 is engaged by a sharp shoulder 166ᵇ, which gives arm 142 a definite forward thrust so that rather quickly it makes contact with contact member 128 if the latter is in the position shown in Fig. 12. Thereafter the slope of groove 166 is more gradual until the end of the groove is reached, at which end a sharp stop 166ᶜ is provided, which will block further turning of the cam.

Upon rotation of the cam from the position of Fig. 14 in a counter-clockwise direction, the side surface of the cam above the bent part 162 will immediately come into contact with said bent part and force arm 149 into contact with contact member 150, and this contact is maintained throughout the remainder of the operative movement of the cam so that the circuit will be maintained, and the circuit will be maintained until the cam is moved back to the inoperative or "off" position, at which time bent portion 152 will be permitted to move back into its notch, and the circuit will be interrupted no matter what position may be assumed at that time by arm 142.

In order to limit the rotational movement of the angularly shiftable speed-controlling member, I prefer to provide stop means between the cam member 112 and the spider provided at the rear portion of the governor casing. In the form shown, the spider portion is provided with a forwardly projecting stop lug 168, best shown in Fig. 14, and the side surface of the cam is adjacent this lug and carries stop shoulders 169 and 170, respectively, which abut the lug in order to stop the cam at the respective limits of its turning movement, the turning movement in the particular case illustrated being approximately 180°.

In order to prevent the turning speed-adjusting member, after being adjusted, from being shaken or jarred out of the adjusted position, suitable means should be provided, and in the case illustrated the forward face of the cover member 114 is provided with a knurled portion 171 of arcuate shape against which presses a small ball 172 (Fig. 6) urged rearwardly by a helical spring 173 located in a socket 174 provided in the governor casing.

Figure 1:
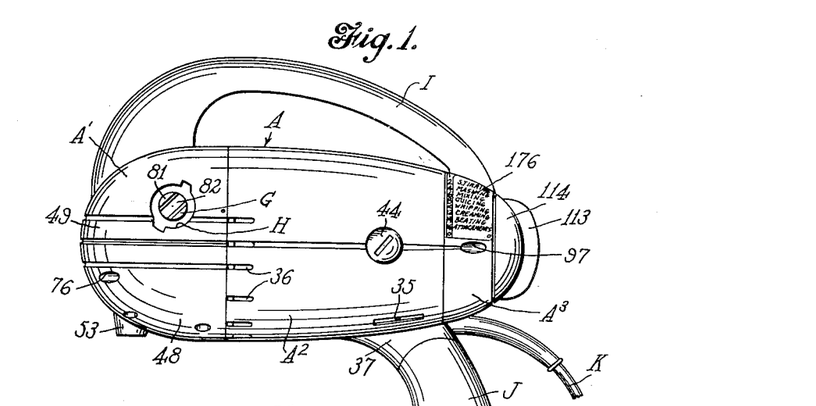
Fig. 1 is a side elevation of an electric motor embodying my improvements, the supporting pedestal being partially shown.
Figure 2:
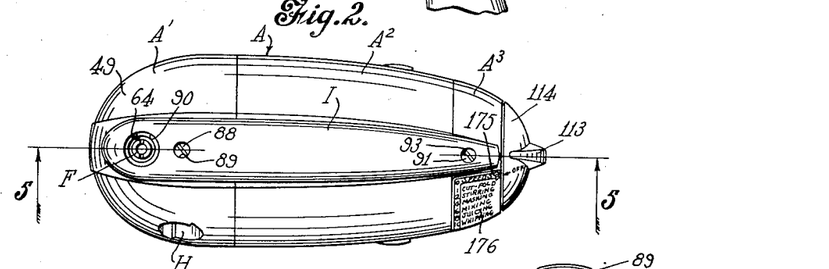
Figs. 2, 3 and 4 are, respectively, a top plan view, a rear view, and a front view.
Figure 3:
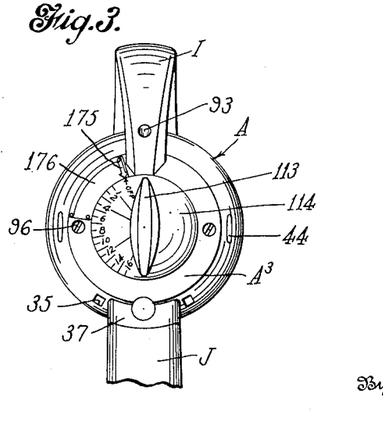

The cover member 114 is preferably provided on its rear face with a speed scale, as shown in Figs. 3 and 10. The indications on this scale, which run for a distance along the periphery of the cover member, are intended to cooperate with a fixed pointer, such as indicated at 175, provided on the governor casing. There may also be on the governor casing indicating means coordinated with the different speed numbers on the cover member, as shown in Fig. 10, so as to show which speed is used for the operation known as "cut-fold," which speed is used for stirring, and so on. For example, in the case illustrated, when the operation of "whipping" is to be performed, which, as shown by the indicating means on the casing, requires a speed of "10," the speed-controlling member will be turned to a position in which the numeral 10 on said member registers with the pointer 175. The indicating means on the fixed portion of the casing may be carried on a separate plate 176, as indicated in Fig. 10, this plate being riveted in place against the external surface of the casing.

Figures 13, 13A:
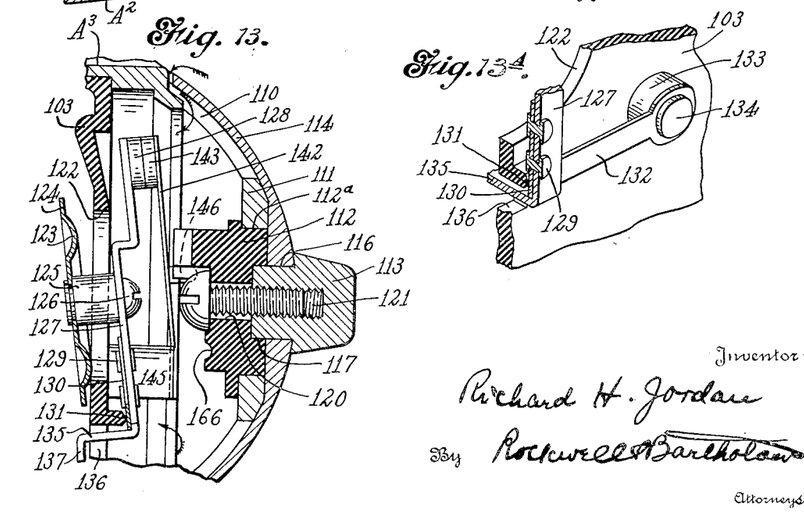
Fig. 13 shows certain parts illustrated in Fig. 12, showing one of the positions assumed by the diaphragm when the motor is in operation.
Fig. 13A is a detail perspective view illustrating in part the means by which the diaphragm is tiltably mounted with respect to the orifice controlled thereby.

For the purpose of controlling the speed of the motor, air enters the governor casing at the rear portion thereof, and in this particular instance passes over the periphery of the cover member 114 in the manner indicated by the arrows in Fig. 13, so as to pass into the governor casing through the spider portion. For this purpose the forward edge of the cover member is slightly spaced in a rearward direction from the adjacent surface of the governor casing.

As above appears, the circuit of the motor is open at two points when the speed-controlling member is in the "off" position. When the speed-controlling member is slightly turned so as to bring it into the position of speed No. 1, the circuit will have been closed at the two points in the manner previously indicated, the contact arm 142 having been moved to a position where it makes light contact with the lever 127. This light contact will be sufficient to shift the diaphragm 123 slightly so as to open the aperture 122 to a slight degree for the passage of air in a forward direction, this air being sucked forwardly as the motor starts and the fan 38 begins to revolve. Air sucked forwardly out of the governor casing by fan 38 passes forwardly to the motor to ventilate the same, along with air sucked into the motor through the slots 35 by means of the regular ventilating fan 34.

As the motor operates in performing the particular operation being carried on, there is a tendency for the motor to speed up as the load is decreased, and as the motor speeds up under such conditions, the fan 38, being more rapidly revolved, exerts a greater suction action upon the diaphragm, causing it to be moved forwardly, and this causes the lever 127 to be tilted in such a manner as to break contact with arm 142. The motor then slows down until lever 127 moves backwardly again to make contact with arm 142 and restore the circuit. This action takes place in substantially the same manner with the speed-controlling member in any one of its different adjustments, but it will be understood that, as the speed-controlling member is progressively advanced toward the higher speed positions, arm 142 will be shifted forwardly more and more. The result of this will be to require a greater shifting movement of lever 127 before the circuit will be broken, and therefore the motor will be permitted to build up to a higher and higher speed. Where, for example, the accessory appliances or "attachments" are used which are associated with and driven from the power shaft and require considerable power for operation, the motor is rotated at the maximum speed for which it is designed, and there will be little if any circuit-interrupting action of the governor.

The arrangement of gearing, as herein described, for driving the vertical tool shaft and the horizontal power shaft is very simple, compact and efficient, requiring a minimum number of parts for the intended purposes. Only two main casing parts for the gear casing section are required, the power shaft being arranged and mounted in the upper part and extending transversely thereof in a space which is effectively utilized. The handle construction of the motor member is also simple, strong and effective. The interior parts are easily accessible for repairs or replacements, if after long use these become necessary.

Figure 18:
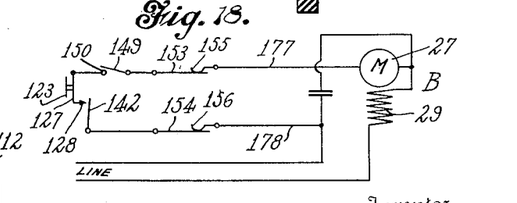
Fig. 18 is a diagram showing the electrical connections.

It will be noted that the electric cable for supplying power passes directly into the main or motor section of the casing, where, in the process of manufacture, the connections to the motor and back to the fixed contact members 155 and 156 through the circuit leads 177 and 178 (note Fig. 18) can be made in a convenient manner. In this connection it is interesting to note that, while the main casing section is preferably made in one casting, and extends continuously throughout the periphery of the motor member, this section is open at both ends, which makes the interior more accessible than it would be otherwise. Obviously one of the last steps incident to the production of the motor section will be the placing in position of the separate partition or wall 31 at its forward end.

The manufacture of the governor section and its contained parts can be separately conducted. After the governor section has been completed, its mere assemblage with and upon the motor section in the manner previously described will cause the motor circuit to be completed. In this particular case two gaps in the motor circuit are closed by the prong members carried by the governor section, but I have in mind that under certain conditions only one such gap might be closed by the assemblage of the two sections of the device. It is also manifest that so far as the governor section is concerned, in the particular form described, it embodies no wiring, the major part of the electrical connections being provided by strip members on the insulating partition. The parts carried by the partition may be conveniently applied thereto before the partition is secured in place in the governor casing.

While I have shown herein but one form of electric motor embodying my improvements, this being the preferred construction, it is to be understood that my invention is susceptible of many different embodiments, and that various changes in the organization of parts and in details can be made without departure from the principles of my invention or the scope of the claims.

What I claim is:

1. In a device such as described, a motor member comprising a casing and an electric motor mounted therein, said motor having on its shaft within the casing a fan, a rotary manually operable member accessible at the rear end of the casing, and means within the casing controlled by said member including an air valve and valve seat behind the fan for varying the motor speed.

2. In a device such as described, a motor member comprising a casing and an electric motor mounted therein, said motor having on its shaft within the casing a fan, a rotary manually operable member accessible at the rear end of the casing, and means within the casing controlled by said member including an air valve and valve seat behind the fan for varying the motor speed, said means further including a rotary cam controlling said valve.

3. In a device such as described, a motor member comprising a casing and an electric motor mounted therein, said motor having on its shaft within the casing a fan adjacent the rear end of the motor, a governor casing applied to the rear end of said first casing, a rotary manually operable member carried by said governor casing at the rear end thereof, and means within the governor casing including an air valve and a cam controlled by said manually operable member for governing the motor speed.

4. In a device such as described, a motor member comprising a casing and an electric motor mounted therein, said motor having on its shaft within the casing a fan adjacent the rear end of the motor, a governor casing applied to the rear end of said first casing, a rotary manually operable member carried by said governor casing at the rear end thereof, and means within the governor casing including an air valve and a cam controlled by said manually operable member for governing the motor speed, said means further including a separate partition in said governor casing having an air port controlled by said valve.

5. In a device such as described, a motor member comprising a casing and an electric motor mounted therein, said motor having on its shaft a fan adjacent the rear end of the casing, said rear end being open, a governor casing closing the open rear end of the casing, a rotary manually operable member accessible at the outside of the governor casing, and means within the governor casing including a cam connected to said rotary manually operable member at the interior of the governor casing, and an air valve in the governor casing, for varying the motor speed.

6. In a device such as described, a motor member comprising a casing and an electric motor mounted therein, said motor having on its shaft a fan adjacent the rear end of the casing, said rear end being open, a governor casing closing the open rear end of the casing, a rotary manually operable member accessible at the outside of the governor casing, and means within the governor casing including a cam connected to said rotary manually operable member at the interior of the governor casing, and an air valve in the governor casing, for varying the motor speed, said cam having an "off" position in which the motor circuit is open at two points.

7. In a device such as described, a motor member comprising a casing and an electric motor mounted therein, said motor having on its shaft a fan adjacent the rear end of the casing, said rear end being open, a governor casing closing the open rear end of the casing, a rotary manually operable member accessible at the outside of the governor casing, and means within the governor casing including a cam connected to said rotary manually operable member at the interior of the governor casing, and an air valve in the governor casing, for varying the motor speed, said cam having an "off" position in which the motor circuit is open at two points, said governor casing carrying an air valve controlled by said cam.

8. In a device such as described, a motor member comprising a casing and an electric motor mounted therein, said motor having on its shaft within the casing a fan, a rotary manually operable member accessible at the outside of the casing, a cam within the casing operable by said rotary member, means controlled by said cam for varying the motor speed, and means controlled by said cam for opening the motor circuit at an additional point when the cam is placed in the "off" position.

9. In a device such as described, a motor member comprising a casing and an electric motor mounted therein, said motor having on its shaft within the casing a fan, a rotary manually operable member accessible at the outside of the rear end of the casing, a cam within the casing arranged axially thereof operable by said manually operable member, and means within the casing cooperating with said fan and controlled by the forward end portion of said cam for varying the motor speed.

10. In a device such as described, a motor member comprising a casing and an electric motor mounted therein, said motor having on its shaft within the casing a fan, a rotary manually operable member accessible at the outside of the rear end of the casing, a cam within the casing arranged axially thereof operable by said manually operable member, means within the casing cooperating with said fan and controlled by the forward end portion of said cam for varying the motor speed, and means within the casing controlled from the side of said cam for opening the motor circuit at an additional point.

11. In a device such as described, a motor member comprising a casing and an electric motor mounted therein, said motor having on its shaft within the casing a fan, a rotary manually operable member accessible at the outside of the casing, and means within the casing controlled by said rotary member and cooperating with said fan for varying the motor speed, said casing comprising separate parts plugged together in assemblage to establish connection between the motor and the speed-varying means.

12. In a device such as described, a motor member comprising a casing and an electric motor mounted therein, a manually operable member accessible at the outside of the casing, and means within the casing controlled by said member for varying the motor speed, said casing comprising separate sections juxtaposed in assemblage in such a way as to complete the electrical connections between the motor and its speed-varying means.

13. In a device such as described, a motor member comprising a casing and an electric motor mounted therein, a manually operable member accessible at the outside of the casing, and means within the casing controlled by said member for varying the motor speed, said casing comprising separate sections plugged together in assemblage for completing the electrical connections between the motor and its speed-varying means, said motor being provided with a fan on its shaft and one of said casing members carrying an air valve cooperating with said fan.

14. In a device such as described, a casing containing an electric motor and open at one end, and a supplemental casing adapted to be applied to said end to close said first casing and containing control means for the motor, said casing adapted on assemblage in juxtaposed relation to connect the motor with its control means.

15. In a device such as described, a casing containing an electric motor and open at one end, and a supplemental casing adapted to be applied to said end to close said first casing and containing speed-control means for the motor, said casings adapted to be plugged together on assemblage to connect the motor with its control means, said control means being of air governor type and said supplemental casing having suitable air inlets.

16. In a device such as described, a casing containing an electric motor, said motor having a fan on its shaft, a supplemental casing applicable to said first casing, a rotary manually operable member accessible at the outside of said supplemental casing, and means within the supplemental casing operable by said rotary member and cooperating with said fan for varying the motor speed, one of said casings carrying prongs by which it is plugged into the other in assemblage for completing the electrical connections.

17. In a device such as described, a casing containing an electric motor, said motor having a fan on its shaft, a supplemental casing applicable to said first casing, a rotary manually operable member accessible at the outside of said supplemental casing, and means within the supplemental casing operable by said rotary member and cooperating with said fan for varying the motor speed, one of said casings carrying prongs by which it is plugged into the other in assemblage for completing the electrical connections, said supplemental casing being provided with an interior removable partition carrying a plurality of conductors forming a part of the connections so completed.

18. A device such as set forth in claim 17 in which the prongs are mounted on and project from the partition.

19. In a device such as described, a casing containing an electric motor, said motor having a fan on its shaft, a supplemental casing applicable to said first casing, a manually operable member accessible at the outside of said supplemental casing, and means within the supplemental casing operable by said member and cooperating with said fan for varying the motor speed, one of said casings carrying prongs by which it is plugged into the other in assemblage for completing the electrical connections, said supplemental casing being provided with an interior removable partition carrying a plurality of conductors included in the connections, said partition having an air port and said speed-varying means including an air valve cooperating with said air port.

20. In a device such as described, a motor member comprising a casing and an electric motor mounted therein, said motor having on its shaft within the casing a fan, said casing having in the rear portion thereof air inlet openings, and said fan being adapted to suck air into the casing through said openings, a partition in said casing having an air port through which the forwardly sucked air is adapted to pass, a diaphragm member controlling said port and movable under varying degrees of suction, and speed-varying means for the motor including a contact member attached to and moving with said diaphragm member.

21. In a device such as described, a motor member comprising a casing and an electric motor mounted therein, said casing being provided within the rear portion thereof with air inlet openings, said motor having on its shaft within the casing a fan adapted to suck in air through said openings and move it in a generally forward direction, a partition within the rear portion of the casing having an air port through which the air is adapted to be sucked in a generally forward direction, a diaphragm member located in front of said partition and adapted to control said port, said diaphragm member having a pivotal mounting, a contact member attached to and moving with said diaphragm member, a swingingly mounted contact member in the rear portion of the casing adapted to make contact with said first-named contact member to close the motor circuit, a rotary cam within the rear portion of the casing adapted to move said second contact member toward the first, and a manipulator for said cam located at the exterior of said casing.

RICHARD H. JORDAN.